US008533096B2

(12) United States Patent
Wong

(10) Patent No.: US 8,533,096 B2
(45) Date of Patent: Sep. 10, 2013

(54) COMPLIANCE RULES FOR DYNAMIC BIDDING

(75) Inventor: David Wong, Sunnyvale, CA (US)

(73) Assignee: SAP Aktiengesellschaft, Walldorf (DE)

(*) Notice: Subject to any disclaimer, the term of this patent is extended or adjusted under 35 U.S.C. 154(b) by 1435 days.

(21) Appl. No.: 10/632,701

(22) Filed: Jul. 31, 2003

(65) Prior Publication Data

US 2005/0027639 A1 Feb. 3, 2005

(51) Int. Cl.
*G06Q 40/00* (2012.01)
(52) U.S. Cl.
USPC ................................. 705/37; 705/35
(58) Field of Classification Search
USPC ........................................ 705/35, 37
See application file for complete search history.

(56) References Cited

U.S. PATENT DOCUMENTS

| | | | | |
|---|---|---|---|---|
| 5,758,328 | A * | 5/1998 | Giovannoli | 705/26 |
| 5,842,178 | A * | 11/1998 | Giovannoli | 705/26 |
| 6,356,909 | B1 * | 3/2002 | Spencer | 707/10 |
| 6,826,543 | B1 * | 11/2004 | Harford et al. | 705/37 |
| 2002/0046081 | A1 * | 4/2002 | Albazz et al. | 705/11 |
| 2002/0046147 | A1 * | 4/2002 | Livesay et al. | 705/37 |
| 2002/0065762 | A1 * | 5/2002 | Lee et al. | 705/37 |
| 2002/0147674 | A1 * | 10/2002 | Gillman | 705/37 |
| 2002/0165814 | A1 * | 11/2002 | Lee et al. | 705/37 |
| 2002/0198818 | A1 * | 12/2002 | Scott et al. | 705/37 |
| 2003/0208424 | A1 * | 11/2003 | Tenorio | 705/35 |
| 2003/0212604 | A1 * | 11/2003 | Cullen, III | 705/26 |
| 2004/0083156 | A1 * | 4/2004 | Schulze | 705/37 |
| 2004/0215467 | A1 * | 10/2004 | Coffman et al. | 705/1 |

FOREIGN PATENT DOCUMENTS

EP 1 041 521 A2 * 10/2000

OTHER PUBLICATIONS

Business Wire, Protel International and WebQuote Software Enetr Into Partnership; Users of Protel's P-CAD 2001 Package Benefit form WebQuote's On-Line PCB Quoting Service, Apr. 3, 2001, 3 pages.*

* cited by examiner

*Primary Examiner* — Lalita M Hamilton
(74) *Attorney, Agent, or Firm* — Fish & Richardson P.C.

(57) ABSTRACT

Systems and techniques to implement compliance rules in a dynamic sourcing system. One or more compliance rules may be associated with an opportunity created using the dynamic sourcing system. A response to the opportunity may be evaluated based on the compliance rule. An action may be taken based on the evaluation.

37 Claims, 14 Drawing Sheets

Create RFQ
Create Auction
Opportunities
   Incomplete
   Open
   Published
   Active
   Closed
   Finalized
   Withdrawn 1. What type of RFQ/RFI would you like to create?

Type ─── 310

Public? ─── 315

2. Select an RFQ/RFI Rule Profile

Rule Profile ─── 320

3. RFQ/RFI Information

Name ─── 325

Classification ─── 330

You are invited to bid on the following

| Opportunity Name | Company | Type | Lot type | Time remaining | Bids | Actions |
|---|---|---|---|---|---|---|
| Cooling System | | | | | | |
| ACME Contract | | | | | | |
| AB 92805 System | | | | | | |

FIG. 6

1. Opportunity Information

Classification  Manufacturing Components -> Rubber parts  — 710

Terms and Conditions  Payment to be made after user trials

Requester  ACME Products, Inc.,  — 315

Currency  EUR

Binding Date  December 19, 2003  — 335

2. Line Items

720 →

| Item | Quantity | Unit | Bid Amount (Total) |
|---|---|---|---|
| Breather Hose | 100 | Each | 500 |
| Air Filter Hose | 100 | Each | 800 |

— 720  — 730

Delivery Date  December 21, 2003  — 740

Submit  — 750

COMPLIANCE RULES FOR DYNAMIC BIDDING

BACKGROUND

The present application describes systems and techniques relating to data processing for commercial transactions.

Dynamic electronic commerce (e-commerce) systems, such as online auction sites, allow for efficient buying and selling of goods and services. The systems are efficient both because they are able to reach a wide variety of geographically diverse participants, and because they allow the characteristics of the transactions to change over time (e.g., the bid amount changes to reflect the price a participant is willing to pay). In contrast, a static e-commerce system (such as a web site advertising products for sale at particular prices) may be less efficient, since purchasers are faced with a "take it or leave it" proposition.

Dynamic e-commerce systems may be particularly beneficial for purchasing agents who routinely enter into contracts for goods and services. For example, a particular company may produce a product for the consumer market that is manufactured using a number of different component parts. The company's purchasing department needs to purchase the component parts from reliable suppliers at the best prices. Dynamic e-commerce systems may allow the company to obtain bids from a number of suppliers, and to choose the best supplier based on the bid amount and/or other parameters. The systems may also simplify record-keeping, since the commercial transaction data is exchanged electronically.

One type of dynamic system allows users (such as purchasing agents) to create data objects including data related to one or more desired commercial transactions. The data objects may be referred to as "opportunities," and the associated data may be referred to as opportunity data. A purchasing agent may create the opportunity by accessing the system and entering opportunity data via a user interface generated by the dynamic system. For example, if a purchasing agent wished to enter into a transaction to obtain 1,000 stepper motors, the purchasing agent could access the dynamic system and create an "opportunity" including data related to the desired purchase.

A standard set of attributes may be associated with each opportunity created using the dynamic system. These standard or "static" attributes may include an opportunity name, an opportunity start date, an opportunity classification, a bid amount and the like. Data corresponding to each attribute (e.g., a bid amount of $100 corresponding to the static attribute "bid amount") may be provided to the dynamic system by a user interacting with the dynamic system via a user interface or may be generated automatically by the system. For additional flexibility, a dynamic system may allow users or systems administrators (persons with the ability to modify the characteristics of the dynamic system itself) with the capability of creating or selecting a non-standard attribute to be associated with some opportunities. Non-standard attributes that may be associated with an opportunity are referred to as "dynamic attributes."

A dynamic system may allow a supplier to view opportunity data and to respond to the opportunity. For example, opportunity data may be emailed to potential suppliers, may be published on a public portal, or may be accessed by a supplier via one or more user interfaces presented to a supplier accessing the dynamic system. To respond to the opportunity (i.e., to submit response data corresponding to opportunity attributes such as a bid amount), the user may enter the response data via one or more user interfaces generated by the dynamic system as part of a response template for the opportunity.

A number of responses may be received for a particular opportunity. In a simple case, the responses may be ranked in order of the bid amount, and a winner determined based on the bid amount. In more complex cases, significant analysis may be desired to ascertain the "best" response to a particular opportunity and to designate a winner.

SUMMARY

The present application teaches systems and techniques for data processing of commercial transaction data.

In one aspect, a method comprises receiving user input to generate an opportunity representing a desired commercial transaction. The method further includes receiving user input to associate a particular compliance rule with the opportunity, where the user input specifies a particular response attribute of a plurality of response attributes to be evaluated according to the particular compliance rule. The user input further specifies the particular compliance rule of a plurality of pre-defined compliance rules.

The method may further include communicating the opportunity to a potential supplier and receiving a response from the potential supplier, where the response includes response attribute data for the particular response attribute. The method may further include evaluating the response attribute data for the particular response attribute using the particular compliance rule. The method may further include performing an action based on evaluating the response attribute data using the particular compliance rule. The action performed may comprise, for example, flagging the response, assigning a weight to the response, discarding the response, or other action. The plurality of pre-defined compliance rules may include a discard rule, a weighting rule, a processing rule, or other rule.

In general, in one aspect, a method may include receiving user input specifying a particular response attribute of a plurality of response attributes to evaluate using a compliance rule. The method may include receiving user input specifying a particular compliance rule of a plurality of pre-defined compliance rules to evaluate attribute data for the particular response attribute. The method may include receiving user input specifying an action to take based on evaluating the attribute data using the particular compliance rule.

The method may further include receiving user input to associate the particular compliance rule with a later-created opportunity representing a particular commercial transaction, where the user input may include a criterion to automatically determine whether to associate the particular compliance rule with the later-created opportunity. The method may include receiving user input to create an opportunity representing a desired commercial transaction, communicating the opportunity to a potential supplier, receiving a response from the potential supplier, and evaluating response attribute data for the particular response attribute using the particular compliance rule. The method may further include receiving user input to define a new compliance rule, or to modify one of the plurality of pre-defined compliance rules.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

FIGS. 3A and 3B are diagrams of an embodiment of a user interface for creating an opportunity.

FIG. 6 is a diagram of an embodiment of a user interface for a potential supplier.

FIG. 7 is a diagram of an embodiment of a user interface for submitting a response to an opportunity.

Like reference symbols in the various drawings indicate like elements.

DETAILED DESCRIPTION

Figure 1A:
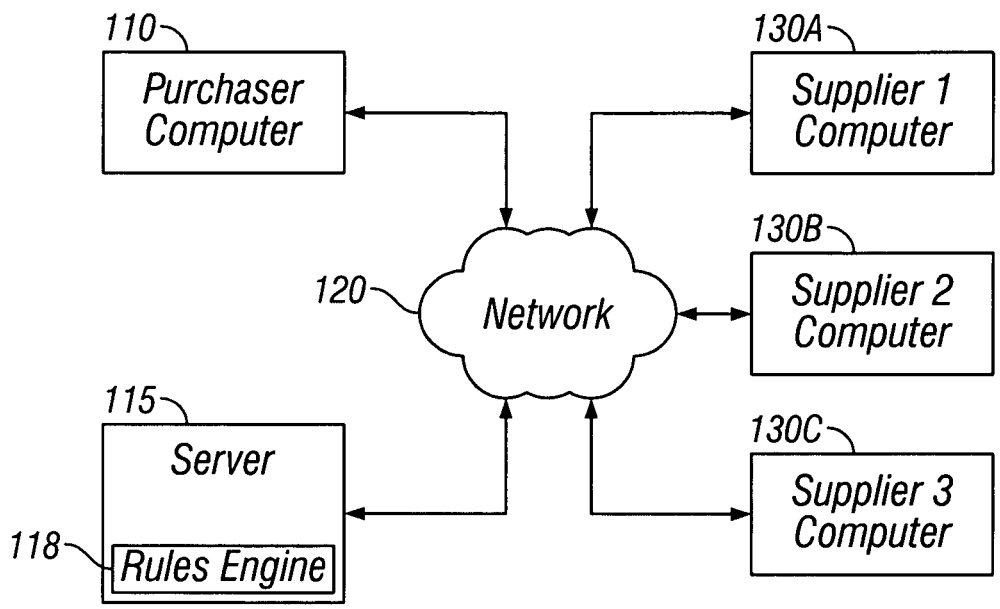
FIGS. 1A and 1B are block diagrams of embodiments of systems for implementing a dynamic bidding tool including a rules engine.

In order to provide more efficient processing of opportunity data, systems and techniques described herein allow for automatic validation of opportunity responses in a dynamic system for electronic commerce, using a rules engine for applying compliance rules to the responses.

As noted above, in a simple case, responses may be ranked according to a bid amount, and the lowest bid amount may be determined to be the winner. However, for more complex commercial transactions, more complex analysis of the responses may be desired. For example, for a particular potential commercial transaction, some suppliers may be preferred, while others may be less desired or even "blacklisted." For some potential commercial transactions, considerations other than cost may be important. For example, a shipping date, shipping material, quantity, or other response attribute may be important in determining a winner for the associated opportunity.

Systems and techniques herein provide for a rules engine that may be incorporated in a dynamic bidding tool. The rules engine may enable more efficient response processing by automatically applying pre-selected rules to responses, thus reducing the analysis necessary to determine a winner for a particular opportunity. The rules engine may also enable more efficient customization of the dynamic bidding tool, by allowing the addition of compliance rules tailored to the particular needs of the dynamic bidding tool user. For example, for a dynamic bidding tool user in the defense industry, the rules engine may be customized to include compliance rules for ensuring that potential suppliers have any necessary security clearance.

The systems and techniques are described with reference to a dynamic bidding tool, referring to a software-implemented e-commerce system. In some implementations, the rule engine is integrated with a dynamic bidding tool, where the dynamic bidding tool allows potential parties to commercial transactions to interact via electronic systems such as computer networks. The dynamic bidding tool may be implemented in a number of ways. It may be implemented so that potential participants are registered with the system before they can participate in commercial activities using the system. Alternately, it may be implemented so that some participants are registered with the system, while others may access and participate in commercial activities through a public venue, such as a public portal.

In an implementation, the dynamic system is a web-based dynamic bidding tool that provides parties with the ability to submit requests for information (RFIs), requests for quotation (RFQs), and to run auctions such as reverse auctions. The dynamic bidding tool may be implemented in a computer system including one or more computers that may be connected via a computer network. One type of user of the dynamic bidding tool is a purchasing agent who needs to purchase one or more products or services, while another type of user of the dynamic bidding tool is a supplier of one or more products/services.

The users described above may create opportunities and responses in order to enter into commercial transactions. In contrast, a system administrator of the dynamic bidding tool may make global changes to the characteristics of the dynamic bidding tool. For example, the system administrator may alter the characteristics of the user interfaces presented to users creating an opportunity.

In an implementation of a dynamic bidding tool, the tool is stored on one or more computer systems, and may be accessed by users through a computer network. For example, a purchasing agent may access the dynamic bidding tool on a local computer, or on a remote computer via a network. FIG. 1A shows an implementation where at least a portion of a dynamic bidding tool is stored on a purchaser computer 110, a server 115, and/or supplier computers 130A-130C. Purchaser computer 110 and/or supplier computers 130A-130C may access server 115 directly or via a network 120. A rules engine 118, which may be integrated with the dynamic bidding tool or separate, is shown stored in server 115.

A user, such as a purchasing agent, uses the dynamic bidding tool to create opportunities. Opportunity data is then stored on, for example, server 115. Purchaser computer 100 is configured to communicate with supplier computers 130A, 130B, and 130C over network 120. Supplier computers 130A, 130B, and 130C may include at least a portion of the dynamic bidding tool. Note that although one purchaser computer 110 and three supplier computers 130A, 130B, and 130C are shown here, different numbers of each type of computer may be used. Further, a company that is a supplier of one particular product/service may be a purchaser of another product/service.

Figure 1B:
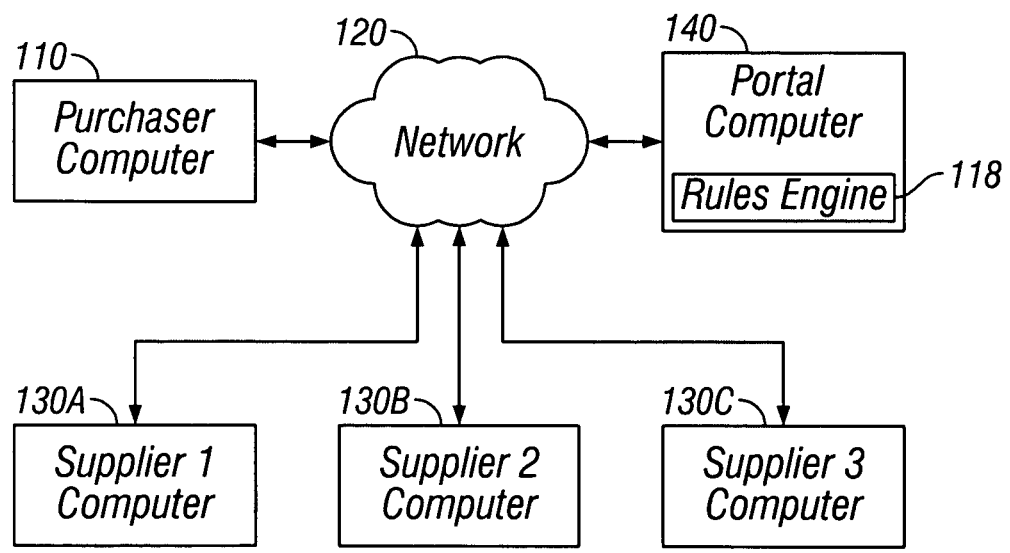

FIG. 1B shows an implementation in which purchaser computer 110 may interact with supplier computers 130A, 130B, and 130C via a portal computer 140 over a network 120, where rules engine 118 is stored on portal computer 140. The network may include one or more local area networks (LANs), one or more metropolitan area networks (MANs), one or more wide area networks (WANs), one or more enterprise networks, one or more virtual private networks (VPNs), or another network such as the Internet.

A rules engine such as engine 118 of FIGS. 1A and 1B may be used to automatically apply compliance rules to responses to opportunities created using a dynamic bidding tool. The following describes an implementation of a dynamic bidding tool that may be used to create opportunities, communicate the opportunities to potential suppliers, receive responses from the suppliers, and evaluate the responses using one or more compliance rules.

Figure 2:
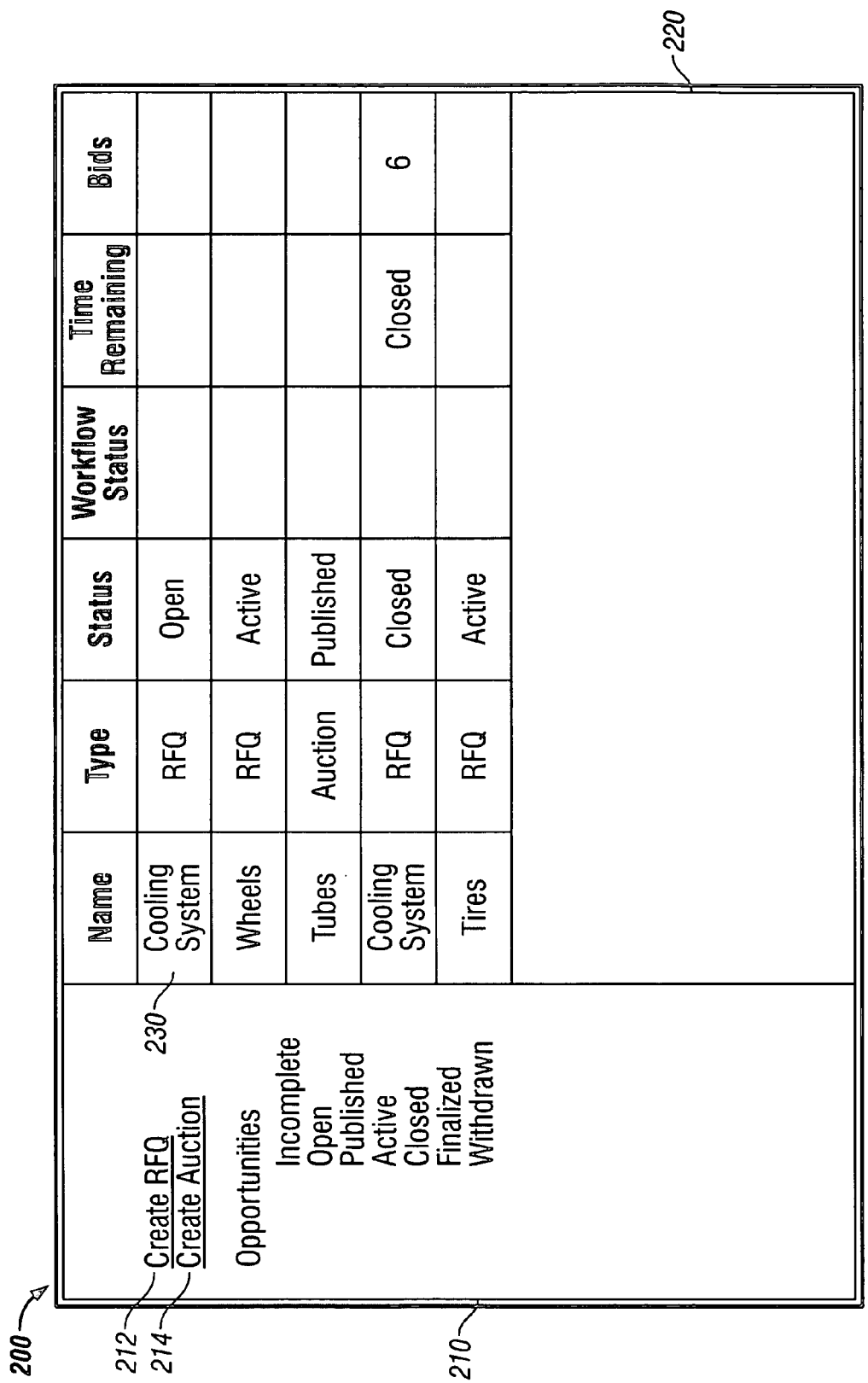
FIG. 2 is a diagram of an embodiment of a user interface for a dynamic bidding tool.

In order to create an opportunity, a user may access the dynamic bidding tool by selecting an icon representing the dynamic bidding tool. A user interface for creating opportunities may then be displayed to the user. FIG. 2 shows an implementation of a user interface 200 for creating an opportunity including opportunity data associated with a desired commercial transaction. Interface 200 may include a first area 210 and a second area 220. First area 210 includes user-selectable navigation items such as a "create RFQ" item 212, and a "create auction" item 214. In response to user selection of a navigation item, the computer system provides a user interface related to that navigation item.

When a user initially accesses the dynamic bidding tool, second area 220 may show a summary of the opportunities that have been created by the user, including an opportunity 230. Opportunity 230 has an opportunity name equal to "Cooling System," an opportunity type equal to RFQ, and an opportunity status equal to "Open." Opportunity 230 may also include a workflow status column, a time remaining column, and a bids column. Other columns may be included to present opportunity-related information to the user.

Figure 3B:
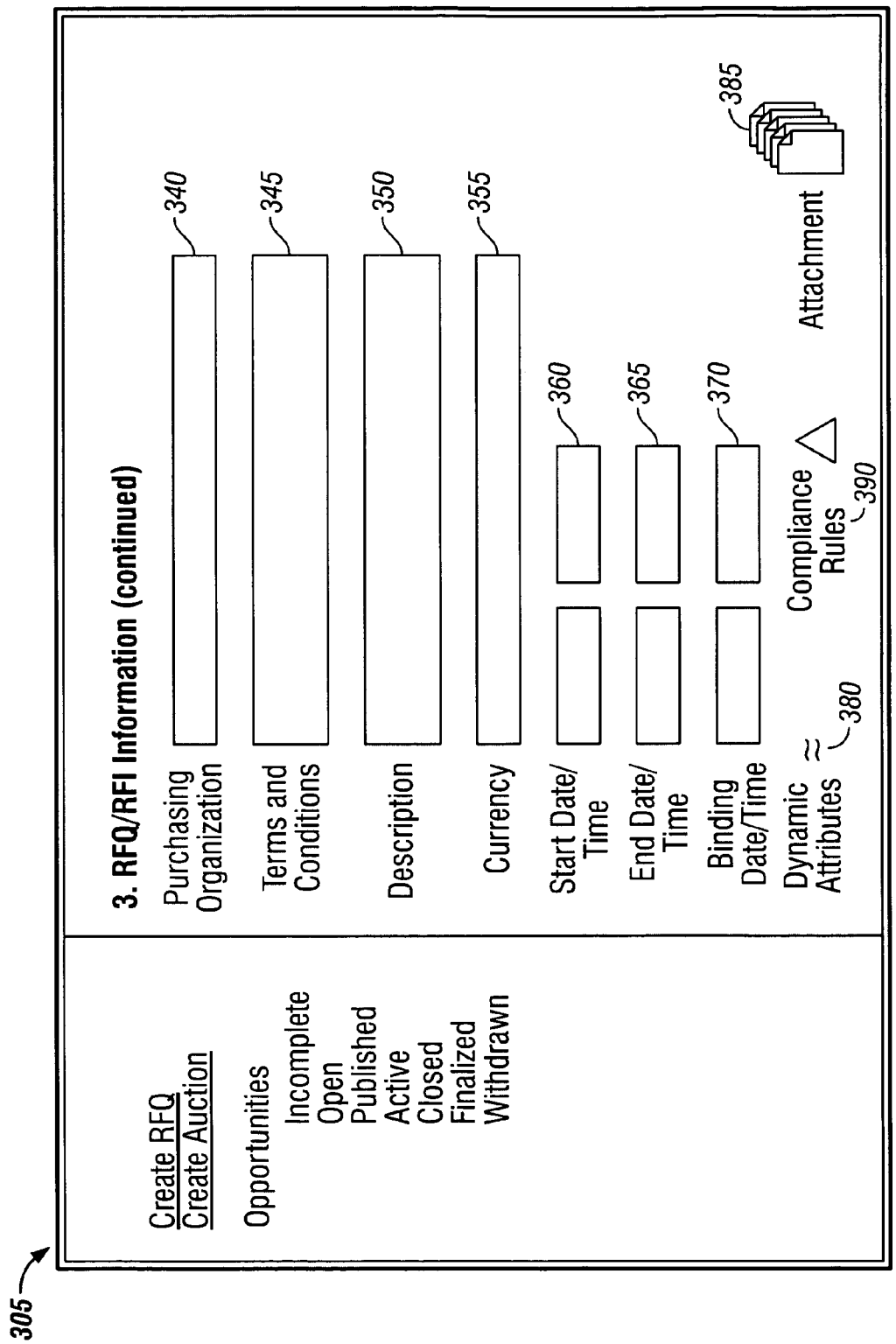

The user may choose to create an RFQ by selecting the "create an RFQ" item in first area 210. In response to selecting the "create an RFQ" item, additional user interfaces may be presented to the user for creating the RFQ (that is, for creating an opportunity with an opportunity type equal to RFQ). FIGS. 3A and 3B show an implementation of a user interface 300. A user may enter an RFQ/RFI type in an area 310, and may choose whether the RFQ will be a public opportunity by selecting/deselecting a checkbox 315. Note that in different implementations, different field types and data entry methods may be enabled. For example, some fields may allow data entry using text boxes, check boxes, and drop-down menu selections.

A user may choose an opportunity rule profile in area 320. The opportunity rule profile includes one or more operational rules that govern the operation of the opportunity. In some implementations, the user may select individual rules as well as or instead of selecting rule profiles. In some implementations, users can create rules and/or rule profiles to govern the operation of one or more opportunities. Note that opportunity rules differ from compliance rules in that opportunity rules govern the operation of the opportunity, while compliance rules are applied to responses to the opportunity.

Opportunity rules may govern whether a potential supplier may submit bids for less than the full desired quantity, and whether a potential supplier may submit bids for fewer than all of the line items in the opportunity. Rules may determine whether an RFQ has a starting price, whether the opportunity has a set closing date and time, whether sealed bidding is allowed, whether anonymous bidding is allowed, whether the opportunity closing date and time may be extended due to activity near the scheduled closing, and/or whether the responses will be ranked based on the price quoted.

The user may name the opportunity in an area 325. Additionally, the user may provide a classification for the opportunity in an area 330. Alternately, the user may choose a classification from a list of classifications by choosing an icon 335. The user may choose or enter a purchasing organization in an area 340, and may choose or enter terms and conditions in an area 345. The user may enter a description in an area 350, a currency in an area 355, a start date/time in an area 360, an end date/time in an area 365, and a binding date/time in an area 370.

A user may create one or more dynamic attributes for the opportunity by selecting an icon 380. One or more attachments can be associated with the opportunity using an attachment icon 385. Note that the attachment feature is separate for convenience; associated attachments may be one type of dynamic attribute that may be associated with the opportunity. The user may select a compliance rules icon 390 to select or create one or more compliance rules for the opportunity. Compliance rules are described more fully below.

Figure 4:
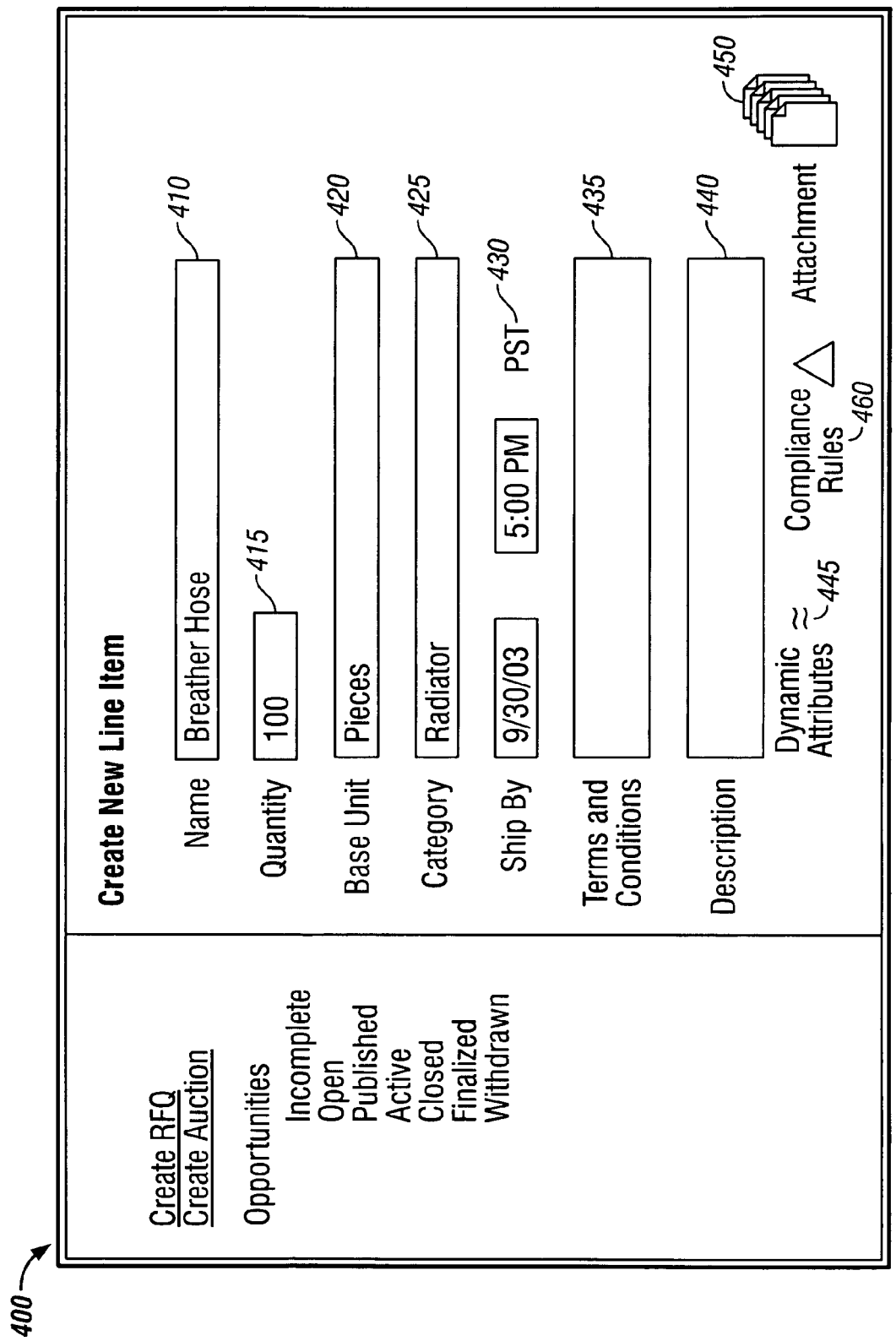
FIG. 4 is a diagram of an embodiment of a user interface for creating a line item for an opportunity.

After general opportunity data is provided, the user may access another user interface to enter data associated with one or more line items for the opportunity, where the term "line item" refers to a particular product or service that is the subject of a desired commercial transaction. FIG. 4 shows a user interface 400 that may be used to create a new line item for an opportunity.

The user may enter a name for the desired product or service in an area 410, and a desired quantity in an area 415. The user may enter base unit data in an area 420, category data in an area 425, ship-by data in an area 430, terms and conditions data in an area 435, and a description in an area 435. The user may create one or more dynamic attributes by choosing an icon 445. One or more attachments can be associated with the line item using an attachment icon 450. One or more compliance rules may be associated with the line item using a compliance rules icon 390.

In order to facilitate commercial transactions, opportunity data, such as the general opportunity data and line item data described above, is communicated to one or more potential suppliers. In some implementation, the user may select particular suppliers to receive opportunity data in order to solicit bids from those particular suppliers. The dynamic bidding tool may include a user interface for selecting suppliers to receive opportunity data.

Figure 5:
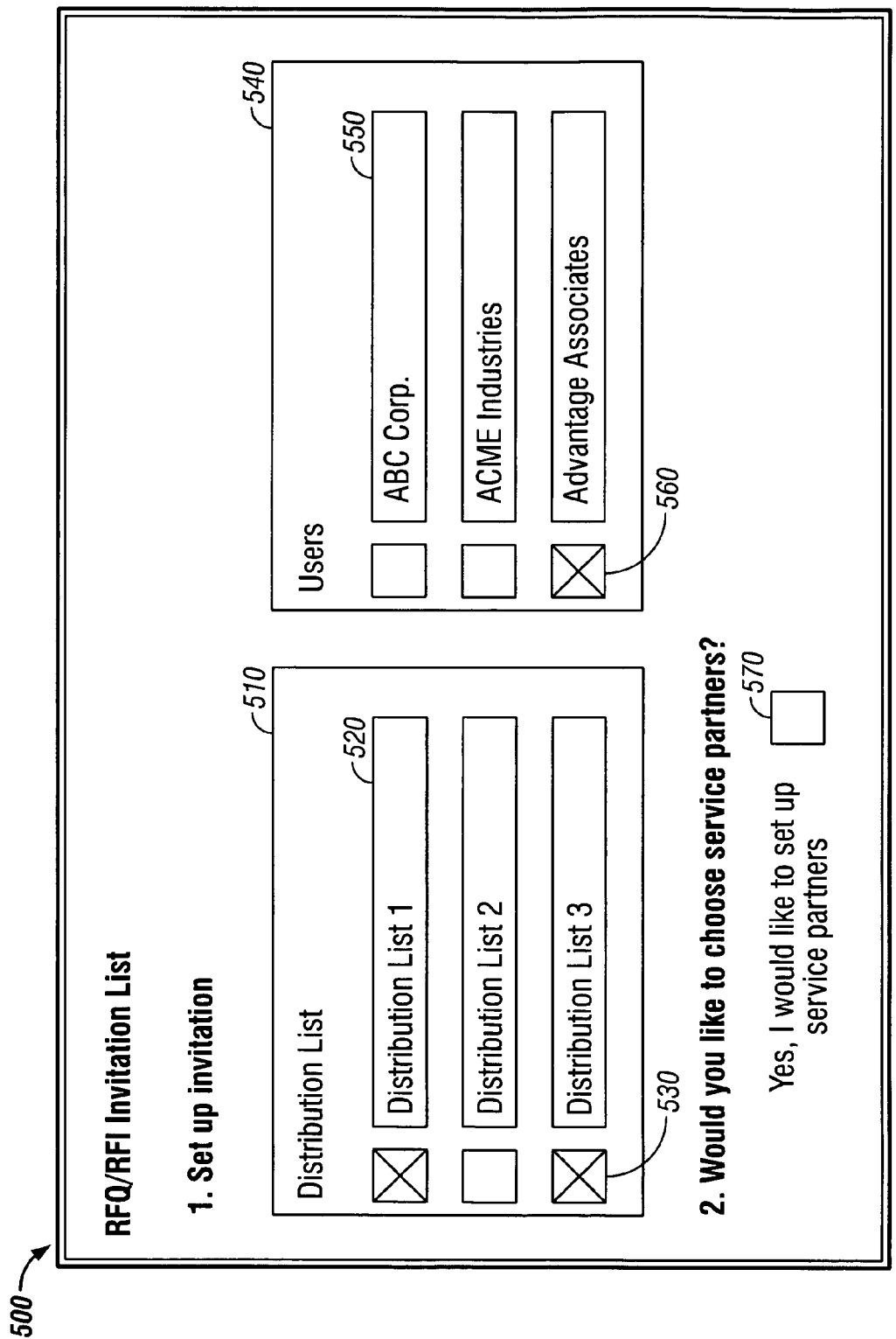
FIG. 5 is a diagram of an embodiment of a user interface for setting up an invitation list.

For example, FIG. 5 shows a user interface 500 for creating an invitation list for an opportunity. The term "invitation list" refers to a list of suppliers to receive the opportunity data. An invitation list may include suppliers selected individually, as well as suppliers listed on one or more distribution lists (a term used to refer generally to a list of recipients related by a particular characteristic). For example, different distribution lists could include preferred suppliers of machined parts, secondary suppliers of machined parts, suppliers of specialty machined parts, and suppliers of machined ceramic parts. There may be overlap among the distribution lists. For example, one supplier of specialty machined parts may also be a preferred or secondary supplier of machined parts. Of course, many other implementations are possible.

In order to add the members of one or more distribution lists to the opportunity invitation list, a user may select one or more pre-existing distribution lists using an area 510. In some implementations, a number of pre-existing distribution lists 520 are presented to the user, who may select one or more of the lists using an appropriate checkbox 530.

The user may select one or more users using an area 540. In some implementations, a number of pre-determined users 550 are presented to the user, who may select one or more using the appropriate check box 560. Users are generally individual recipients that may or may not be included in one or more distribution lists. For example, each of the machined parts suppliers on the distribution lists described above may be listed as available users. Providing the capability for choosing individual potential suppliers provides more flexibility for the purchaser.

The user may choose to set up service partners by selecting a checkbox 570. Generally, service partners include preferred and/or contracted providers for services such as logistics and insurance. Providing the capability to choose service partners may lower the cost of the services to the purchaser/supplier, since rates for the services can be negotiated prior to the particular commercial transaction reflected in the opportunity.

Once the general opportunity data, line item data, and invitation list data have been provided, the opportunity data may be saved. Opportunity data may then be provided to suppliers on the invitation list (and/or the general public, if the opportunity is public) so that they may respond.

An opportunity can be communicated to a prospective supplier via email, where the email includes a link to the opportunity. That is, the email may include a user-selectable item for accessing a response template including one or more user interfaces, where the user interfaces allow the supplier to view portions of the opportunity data (e.g., a list of the line items, the requested ship by dates, etc.), as well as to respond to the opportunity (e.g., by entering data such as a bid amount and bid quantity for one or more line items of the opportunity). Alternately, the prospective supplier may log on to a dynamic bidding tool and access response templates associated with opportunities to which he has received an invitation.

For example, a supplier may log into a dynamic bidding tool and view a user interface such as interface 600 of FIG. 6. Interface 600 includes a list 610 of opportunities to which the supplier has been invited to submit a bid. Interface 600 may display additional data about the opportunities, such as the company initiating the opportunity, the opportunity type, the lot type, the status, the time remaining, and the number of bids received. A supplier may bid on an opportunity by choosing a "create bid," selection from a drop-down menu in an action column 620.

In response to selecting "create bid" for a particular opportunity, one or more user interfaces for responding to the opportunity are presented to the user. For example, FIG. 7 shows a user interface 700 for creating a response to opportunity. A first area 710 includes details about the opportunity, such as the opportunity classification, terms and conditions, requester, currency, and binding date. Interface 700 includes a second area 720 with details about particular line items for the opportunity. For the example shown in FIG. 7, the opportunity rule profile was full/full (bids must be for the full quantity of each of the line items). Therefore, the supplier enters a total price in a box 730. The supplier chooses a delivery date in an area 740. The supplier selects a "submit bid" button 750 to submit the bid.

The opportunity data is generally communicated to a number of suppliers, in order to solicit multiple bids for the line items in the opportunity. An opportunity generally has a start date and time (the date and time after which potential suppliers may respond to the opportunity), and an end date and time (the time after which no more responses are accepted). Once the end date and time has passed, the opportunity is closed and a winner is determined. In some implementations, the winner may be determined automatically, based on one or more compliance rules.

Figure 8:
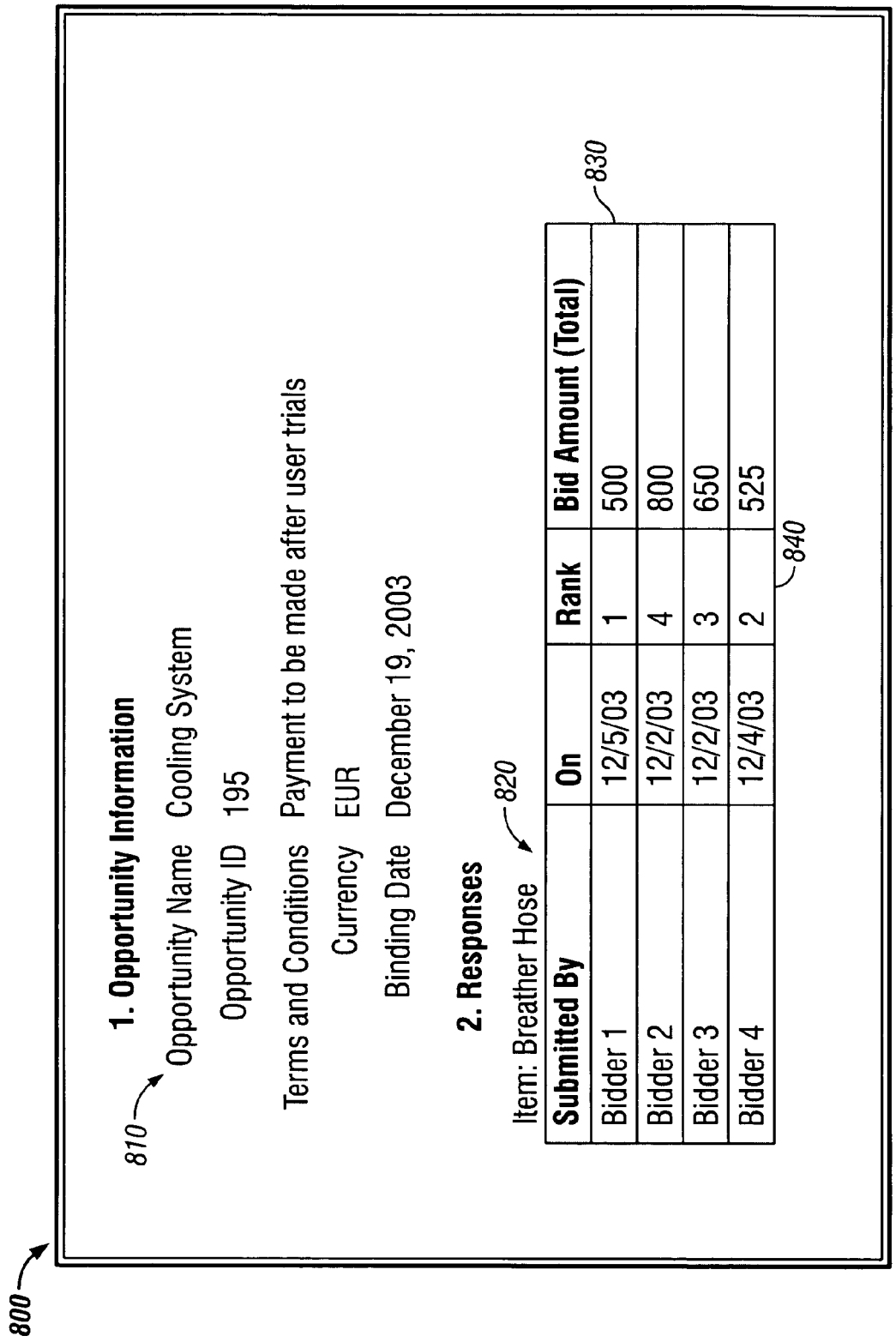
FIG. 8 is a diagram of an embodiment of a user interface for winner determination.

In other implementations, the opportunity initiator or other user may determine the winner based on response data for the opportunity. A user interface such as interface 800 of FIG. 8 may be provided to the appropriate user for winner determination. Interface 800 includes a first area 810 with general information about the opportunity. Interface 800 includes a second area 820 including bid information for the opportunity. For example, second area 820 may include information pertaining to all bids submitted for the opportunity. The information may include a bid amount 830 for each bidder, as well as a ranking 840 for each bidder, where ranking 840 may be based on the application of one or more compliance rules.

Compliance rules may fall into a number of general categories. Discard rules may be used to discard particular responses based on criteria. For example, a discard rule may be used to discard all responses from a particular vendor by comparing a Supplier ID attribute of the opportunity response to a list of "blacklisted" vendors. Weighting and ranking rules may be used to assign different weights to different response attributes, and the responses may be ranked to reflect the weighting. For example, if an item is particular difficult to obtain, a large quantity of the item may be assigned a substantial weight. In such a case, a bid offering (for example) 100 units at a unit price of $100 each may be ranked higher than a bid offering 70 units at a unit price of $80.

Processing rules may be used to route responses through one or more processes based on a response attribute. For example, a processing rule may determine if a bid amount is above a threshold amount, and to route the response through an approval process if it is. Order of precedence rules may be used to break a tie. Other rule types are possible.

Figure 9A:
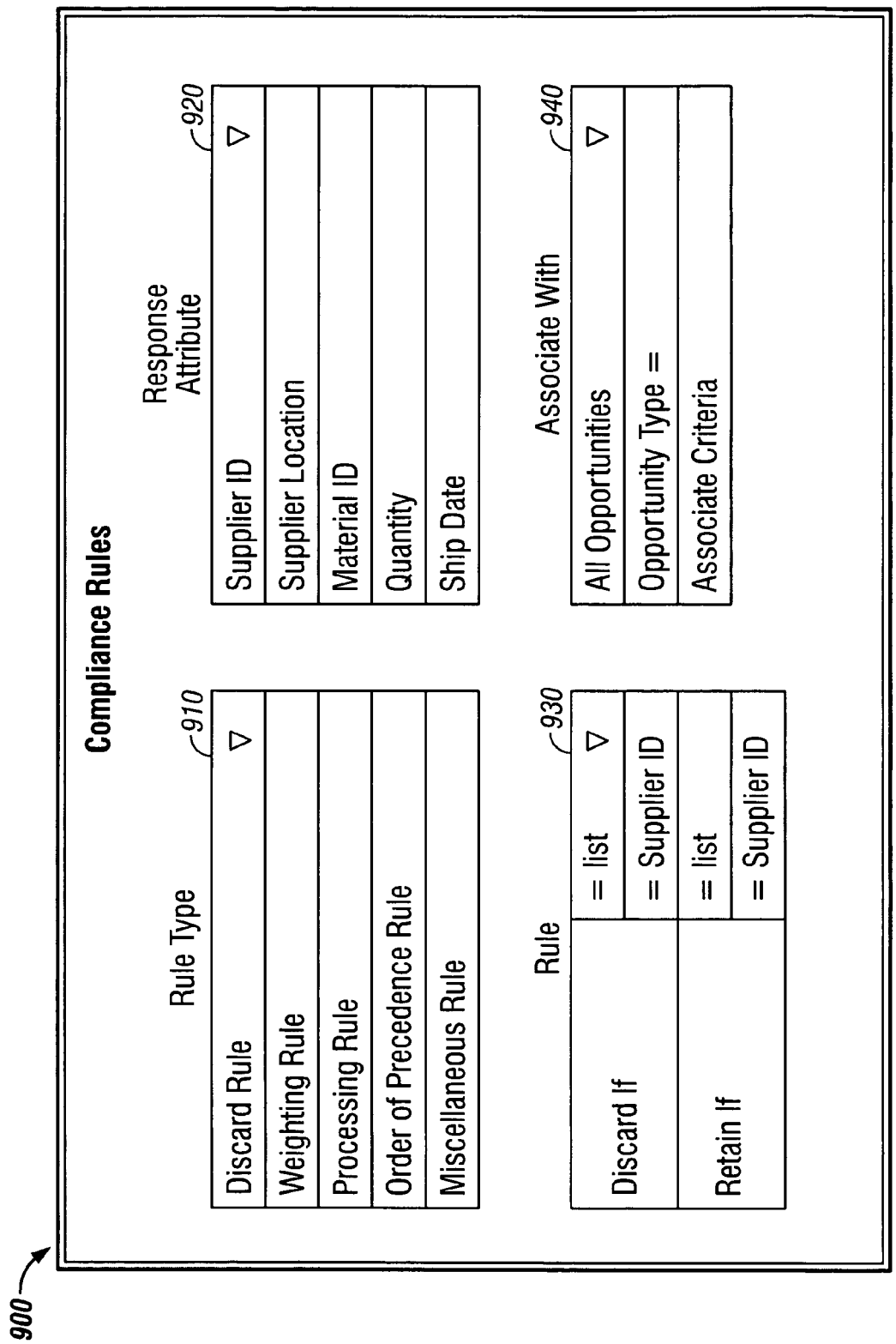
FIGS. 9A and 9B are diagrams of embodiments of user interfaces for associating compliance rules with opportunities.

FIG. 9A shows a user interface 900 that may be used by an opportunity initiator to associate a compliance rule with an opportunity, or by a systems administrator to automatically associate a compliance rule with one or more later-created opportunities. A rules engine of a dynamic bidding tool may generate user interface 900 in response to a user selection of a compliance rules icon such as icon 390 of FIG. 3B. Note that interface 900 would generally include other information, which is not included in FIG. 9A for clarity.

A user may select a rule type from a list 910. The user may select a response attribute from a list 920, where list 920 may include response attributes for the particular opportunity (if an initiator is associating a compliance rule with a particular opportunity), or may include response attributes that may be associated with later-created opportunities (if a systems administrator is setting up a compliance rule to be associated with later-created opportunities).

The user may then select a rule from a pre-defined list of rules using a list 930. For a discard rule, interface 900 may allow the user to frame the discard rule in terms of the responses that will be discarded or those that will be retained (i.e., if the criteria are not met, the response is discarded). The user may choose to discard suppliers whose supplier ID (e.g., an identifying number, a supplier name, or other ID) is on a list. The user may choose to discard suppliers by selecting one or more individual suppliers by a supplier ID. Note that multiple lists and/or multiple suppliers may be selected for a particular discard rule.

If a systems administrator is setting up a compliance rule to be associated with later-created opportunities, the systems administrator may choose to associate the compliance rule with all later-created opportunities, or with fewer than all. The systems administrator may select an appropriate option from a list 940. Note that the "Associate Criteria" option may allow the systems administrator to choose particular opportunity criteria to associate the discard rule with the later-created opportunity, thus allowing optimal customization of compliance rules. In an example, a particular company may consider bids from a particular supplier for machined parts, but not for specialty machined parts. The systems administrator may select the "Associate Criteria" option of list 940, then select criteria specifying that the compliance rule is to be associated with later-created opportunities having a line item with a classification equal to a specialty machined part.

Figure 9B:
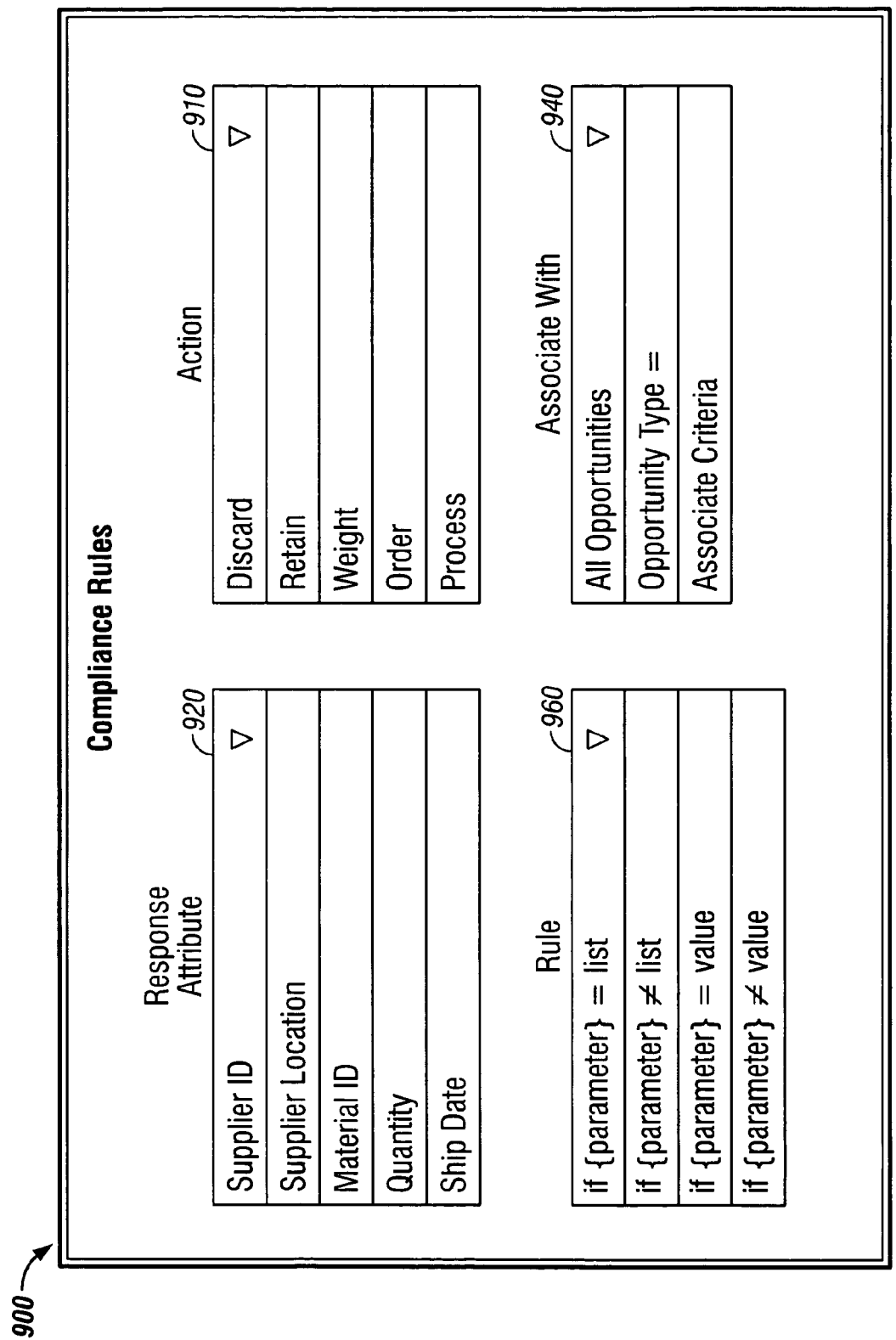

FIG. 9B shows an alternate implementation of a user interface 905 that may be generated by a rules engine of a dynamic bidding tool for associating a compliance rule with one or more opportunities. Again, interface 905 would generally include other information, which is not included in FIG. 9B for clarity. A user may select a response attribute from a list 920. Rather than selecting a particular rule type as in FIG. 9A, a user may select a particular action to be taken from an action list 950, then select a rule from a list 960 of pre-defined rules. For example, to discard responses from a particular supplier, the user may select the "Supplier ID" selection from list 920, the "Discard" selection from list 950, and the "if {parameter}=value" selection from list 960, then specify the particular supplier ID or ID (e.g., from a list, or by providing a supplier name or other identification).

A rules engine may include a standard set of pre-defined compliance rules, which may include rules such as those described above. In addition, a systems administrator may modify or add compliance rules to meet the needs of a particular dynamic bidding tool user or group of users. For example, for a company in a particular industry, the systems administrator may add industry-specific compliance rules or modify available compliance rules to be industry-specific. The following examples detail scenarios in which compliance rules may provide a particular benefit. Of course, may other scenarios are possible.

Supplier exclusion/ranking

In many situations, the identity or other attribute of a potential supplier may be important in determining whether the particular supplier is the best choice for a particular opportunity. Thus, an opportunity initiator or systems administrator may wish to associate a compliance rules with an opportunity, so that a response is automatically evaluated with respect to particular supplier attribute data. For example, an opportunity initiator may wish to exclude one or more particular suppliers from a particular commercial transaction based on the identity of the supplier. To do so, the initiator may implement a compliance rule checking the supplier identification for each received response against an excluded supplier list. Upon receiving a response from a supplier whose identity is included on an associated exclusion list, the system may discard the response or may tag it to ensure that it is not considered during winner determination.

Using a compliance rule to exclude particular responses from consideration may be beneficial in some circumstances. For example, a purchaser may wish to publish an opportunity on a public portal or other public venue. Since the opportunity is public, undesirable suppliers may respond. By implementing a compliance rule to exclude suppliers based on a supplier identity (or other supplier attribute), the purchaser need not manually discard or ignore bids from particular suppliers.

Compliance rules may take actions other than discarding bids from particular suppliers based on the supplier identity. For example, a weighting rule may be associated with an opportunity, where responses submitted by suppliers on a preferred supplier list are assigned a greater weight than responses from suppliers on a secondary supplier list. Responses from suppliers on a secondary supplier list may in turn be assigned a greater weight than responses from suppliers not included on any list.

Criteria other than the identity of the supplier may be used. In some circumstances, the purchaser may implement one or more compliance rules based on geographic criteria (i.e., a supplier location). For example, an opportunity for perishable goods (e.g., produce) may discard responses submitted by suppliers from outside certain geographic areas. Alternately, responses from suppliers in certain geographic areas may be discarded or assigned a lower weight due to political or regional instability. Other possible criteria include a supplier security clearance or supplier security rating. For example, if the purchaser is obtaining materials for a defense-related purpose, responses may be discarded if a supplier does not have a certain security rating or clearance.

Approval or other user intervention processes

In some implementations, compliance rules may be used as part of an overall approval process. For example, a particular company may allow responses with bid amounts under a threshold amount to be processed without approval, while responses with a bid amounts equal to or greater than the threshold amount require an automatic approval process or an approval process requiring human intervention.

For example, a purchaser may implement a compliance rule designating bids over a threshold bid amount as requiring the approval of a purchasing manager. An opportunity may be created, may be associated with the compliance rule, may be published to one or more suppliers, and responses to the opportunity may be received. If all responses include bid amounts that are less than the threshold bid amount, winner determination may take place (either automatically or manually) without requiring the approval of the purchasing manager.

If some responses include bid amounts that are less than the threshold and some include bid amounts that are greater than the threshold, the responses may be processed in a number of ways. For example, the bid amounts may be compared (automatically or manually) to determine a winner. If the winning bid amount is less than the threshold amount, no approval or other intervention may be required. However, if the winning bid amount is greater than or equal to the threshold amount, the purchasing manager's approval may be required. In an alternate processing method, responses including bid amounts greater than or equal to the threshold amount may be submitted to the purchasing manager for approval prior to determining a winner.

Similarly, if all bid amounts equal or exceed the threshold amount, winner determination may be performed before or after obtaining the purchasing manager's approval. If winner determination is performed after obtaining the purchasing manager's approval, it may be beneficial to select more than one winning response, in case the winning response is not approved. For example, three responses may be ranked in order of preference and the highest ranking response that is approved will be the winner.

Response includes alternate parameters

In some cases, a potential supplier may wish to submit a response on an opportunity, but may include parameters in the response that are different than the requested parameters. For example, FIG. 4 shows an opportunity with a breather hose line item. A particular material or part number for the breather hose may be specified in the opportunity. A supplier receiving the opportunity may wish to respond with a breather hose of an alternate material or of an alternate part number.

Compliance rules may be used to determine if such a substitute part is acceptable. For example, a purchaser may implement a compliance rule to compare a proposed substitute part with a valid substitute parts table. If the material or part number is listed on the table, the response may be considered. If the material or part number is not listed on the table, the response may be discarded.

Other variations are possible. For example, if the proposed substitute is on the list, the response may be accepted, but a lower weight may be assigned to the response including the substitute part than a response including the specified part. There may be graded weights, where responses with a substitute part not on the approved list are given the lowest weight, responses with a substitute part on the approved list are given a higher weight (there may be additional weighting within the list), and responses with the specified part are given the highest weight.

Other types of parameters may be different than parameters specified in the opportunity. For example, a proposed shipping date may be prior to or after a specified shipping date (or range). As in the example above, compliance rules may assign weights to response attributes different than specified attributes, may compare the proposed parameter to a list of acceptable parameters, or may discard responses including non-specified parameters.

Opportunities listing particular products and/or services

Compliance rules may be used with opportunities listing particular products/services. For example, some products are graded or certified according to governmental standards or guidelines. Others may be graded or certified by other entities, such as professional associations. Additionally, some products may have other particular attributes of importance to the purchaser. These attributes may be solicited from potential suppliers in the response template, and compliance rules may be used to take one or more actions (e.g., rank, sort, and/or discard) responses based on the attribute.

In an example, an opportunity may be created to obtain bids on precious or semi-precious metals. Since the purity of the material may be of importance in its use, the response template for the opportunity may require potential suppliers to provide purity information. For example, the supplier may be required to specify the purity level of the material, the method used to determine the purity level, the source of the material, and/or other purity information. Compliance rules may exclude or weight responses based on purity information. For example, materials with a purity level less than the desired level may be assigned lower weights or may be discarded.

In the above examples, compliance rules may provide a benefit in a dynamic bidding tool by allowing the system to automatically take some actions without user intervention. For example, a purchasing agent need not view every quotation submitted in response to an RFQ to weed out those responses including unacceptable or non-optimal response parameters. Of course, the above list details only a few examples of the many situations in which compliance rules may provide a benefit.

Figure 10:
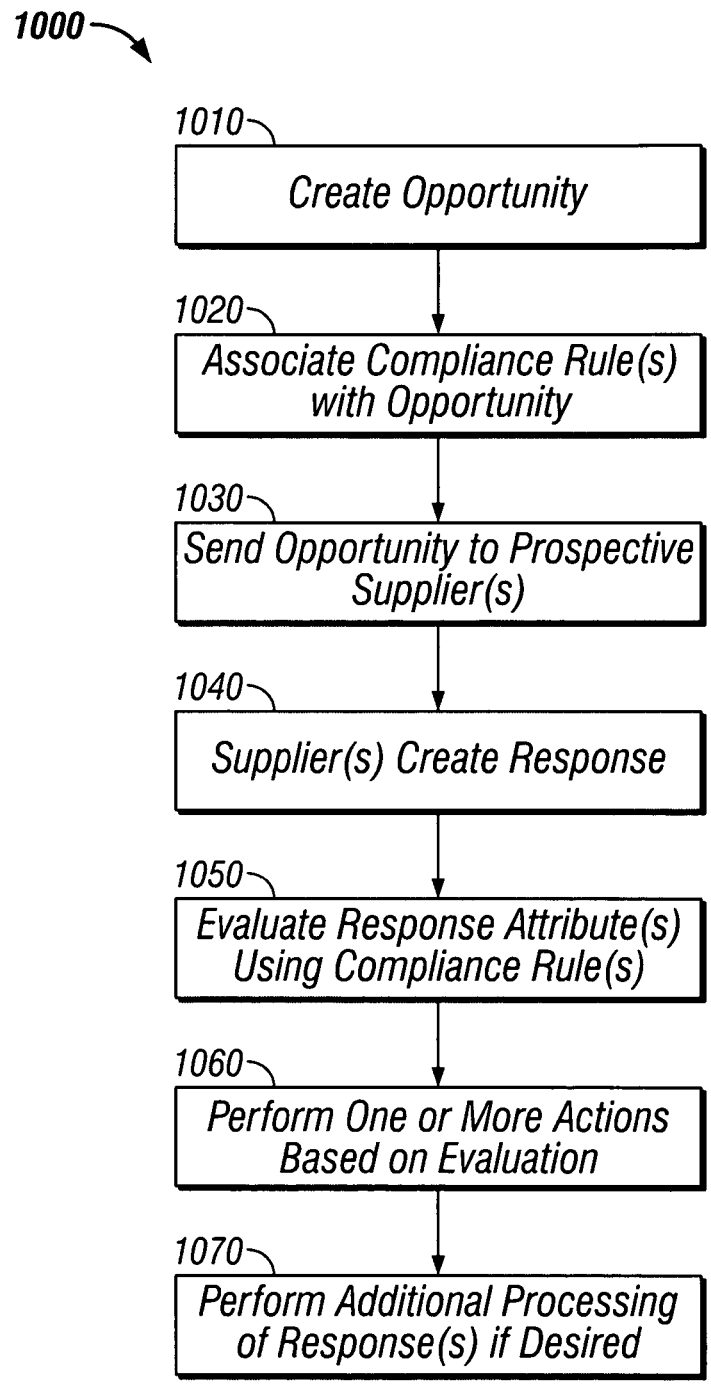
FIG. 10 is a diagram of a process for associating compliance rules with a particular opportunity and for evaluating a response using the compliance rules.

FIG. 10 shows an example of a method 1000 for implementing compliance rules in a dynamic bidding tool. An initiator creates an opportunity (1010) using the dynamic bidding tool. For example, a purchasing agent creates an opportunity to source a particular product. In creating the opportunity, the initiator may generate one or more dynamic attributes. As explained above, static attributes are those attributes that are common to all opportunities or all opportunities of a particular type, while dynamic attributes are associated with some opportunities but not others. Dynamic attributes may be created to obtain additional information from potential suppliers. Such dynamic attributes generally result in the display of additional fields in the supplier response template (see, e.g., FIG. 7).

The initiator associates one or more compliance rules with the opportunity (1020). Compliance rules may be associated with an opportunity in a number of different ways. For example, a pre-defined set of rules may be available to the initiator. The initiator may choose one or more response attributes to be evaluated and may choose one or more compliance rules from the pre-defined set of rules.

The opportunity may be communicated to one or more potential suppliers (1030). For example, the opportunity may be published on a public portal or other public venue, or may be communicated to selected suppliers on an invitation list (see, e.g., FIG. 5). A prospective supplier may create and send a response to the opportunity (1040).

One or more response attributes may be evaluated using the associated compliance rules (1050), and one or more actions may occur based on the evaluation (1060). For example, a compliance rule may compare response attribute data for a response attribute with reference data, and may discard the response based on the comparison (e.g., discard responses including substitute parts not on a substitute parts list). The compliance rule may assign a weight to a response based on the comparison (e.g., assign a lower weight to a response including a substitute part than to a response including a specified part). The compliance rule may invoke a process based on the comparison (e.g., may invoke an automated or manual approval process based on the comparison). May other alternatives are possible.

The responses may be further processed (1070). For example, a ranking process may be implemented, which may use one or more weights assigned to response to rank valid responses according to a pre-determined process. Additionally, a winner determination may be made. Winner determination may be at least partly automatic (e.g., the system determines the winner based on the response attribute data and/or other evaluation), or may be manual.

Figure 11:
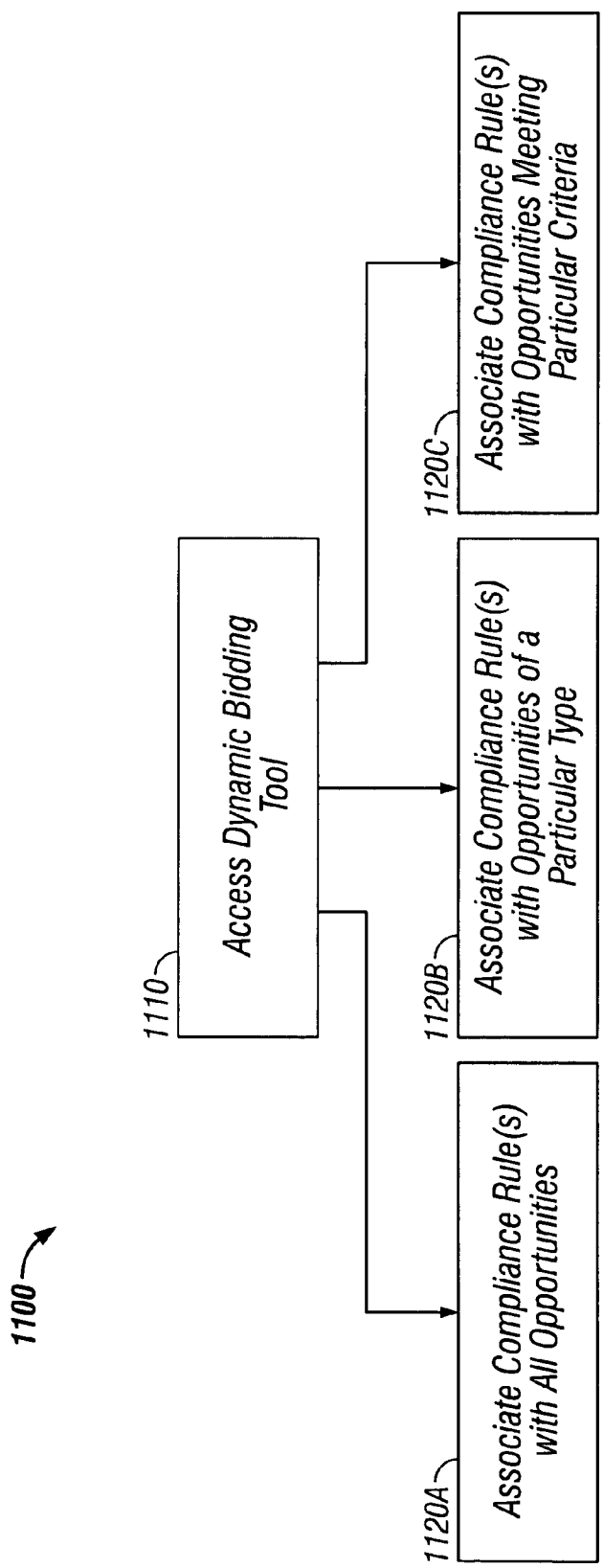
FIG. 11 is a diagram of a process for associating compliance rules with later-created opportunities.

FIG. 11 shows another example of a method 1100 to implement one or more compliance rules in a dynamic bidding tool. In some situations, it may be beneficial to implement particular compliance rules for particular types of opportunities without requiring an initiator to associate the compliance rules with each opportunity separately. In such situations, a dynamic bidding tool user such as a system administrator may associate one or more compliance rules with all opportunities, opportunities of a certain type, or opportunities meeting certain criteria.

In an implementation, a user such as a system administrator may access a dynamic bidding tool (1110). The user may choose to associate one or more compliance rules with all opportunities created (1120A); that is, with all RFQs, all reverse auctions, and the like. Alternately, the user may choose to associate one or more compliance rules with all opportunities of a particular type (1120B). For example, the user may choose that all RFQs be associated with one or more compliance rules, but that reverse auctions are not necessarily associated with the particular compliance rule (but an opportunity initiator may have the ability to associate the compliance rule with a particular instance of a reverse auction, if desired). In another alternative, the user may choose to associate one or more compliance rules with opportunities meeting one or more criteria (1120C). For example, for all opportunities including one or more line items for a particular product or product family (e.g., precious metals), a compliance rule evaluating purity information may be associated with the opportunity. Subsequently, when an initiator creates an opportunity (or an opportunity of the particular type or meeting the criteria), the compliance rules are associated with that opportunity (1130).

Figure 12:
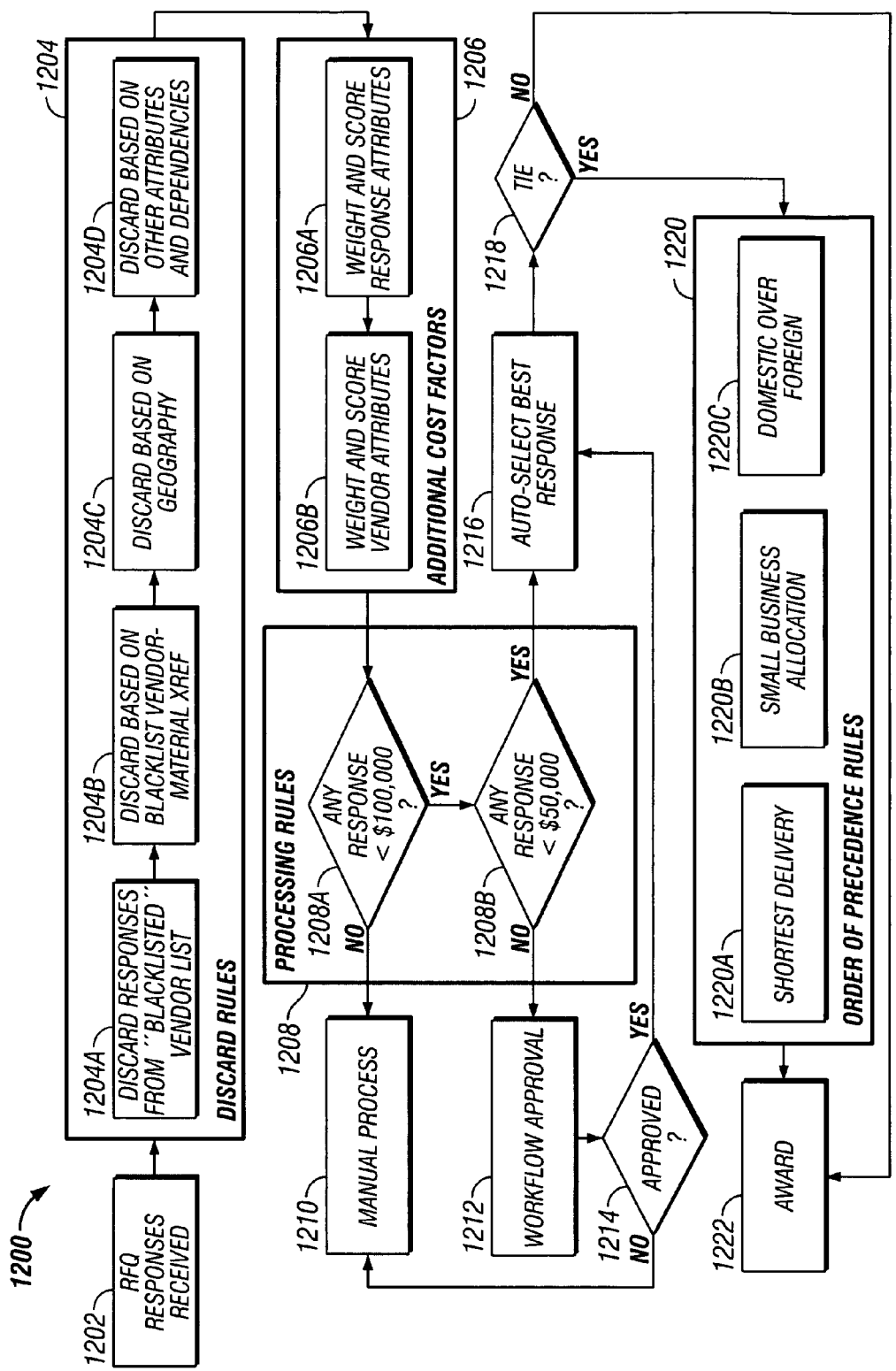
FIG. 12 is diagram of a process for evaluating a response according to a particular set of compliance rules.

FIG. 12 shows an example of a process 1200 for evaluating responses based on a particular set of compliance rules. The compliance rules may be associated with the particular opportunity by the opportunity initiator, or may be automatically associated with the opportunity. The process may be implemented using a system including a compliance rule engine of a dynamic bidding tool such as that described above.

One or more responses to be evaluated may be received by the system (1202). The system may first evaluate a response using one or more discard rules (1204). For example, the system may determine if the response should be discarded because the respondent is included on a "blacklist" of suppliers from whom responses will not be considered (1204A). Such a compliance rule may be implemented by comparing a supplier ID for the response with a list of blacklisted suppliers. The system may determine if the response should be discarded based on a particular combination of supplier and material (1204B). That is, the system may discard some bids from a particular supplier based on the material, while the system does not discard other bids from the same supplier. Such a compliance rule may be implemented by comparing a supplier ID for the response with a list of restricted supplier IDs. If the supplier ID is on the list, the system may compare the material of the response to a blacklist of materials for that particular supplier, and may discard the response based on the comparison. The system may discard a bid based on geography (1204C). The system may discard the bid based on other attributes and/or dependencies (1204D).

In FIG. 12, discard rules operate on the response(s) before other rules are applied. If a response is not discarded, one or more cost factor rules may be applied (1206). For example, the system may assign a weight and score to response attributes (1206A). The system may assign a weight and score to vendor attributes (1206B).

The system may evaluate the response using one or more processing rules (1208). For example, the system may determine whether any response is for a bid amount less than $100,000 (1208A). If not, a manual process for approving the bid may be required prior to further processing of the response using the dynamic bidding tool (1210). If one or more responses is for a bid amount of less than $100,0000, the system may determine if any response is for a bid amount of less than $50,000 (1208B). If not, an automatic workflow approval process may be initiated (1212). The system implements the automatic workflow approval process to determine whether the bid is approved (1214). If not, a manual approval process may be required prior to further processing of the response using the dynamic bidding tool (1210).

If one or more bids is approved, or there is a response with a bid amount less than $50,000, the system may automatically select a best response (1216). If the system determines that there is a tie (1218), the system may apply one or more order of precedence rules (1220). For example, the system may select the response with the shortest delivery (1220A), apply a small business allocation rule (1120B), or may select a response from a domestic supplier rather than a foreign supplier (1220C).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although only a few embodiments have been described in detail above, other modifications are possible. Many types and implementations of compliance rules may be used. Different implementations of a dynamic bidding tool may be used. Many different user interfaces may be generated to obtain user input. Additionally, the logic flows depicted in FIGS. 10 through 12 need not be performed in the particular order shown, or sequential order, to achieve desirable results. In certain implementations, multitasking and parallel processing may be preferable.

A number of implementations have been described. Nevertheless, it will be understood that various modifications may be made without departing from the spirit and scope of the invention. Accordingly, other implementations are within the scope of the following claims.

What is claimed is:

1. A computer-implemented method comprising:
receiving, at a computing system, user input to generate an opportunity representing a desired commercial transaction, the user input including opportunity data associated with the desired commercial transaction; receiving, at the computing system, user input to associate a particular compliance rule with the opportunity, the user input specifying a particular response attribute of a plurality of response attributes to be evaluated according to the particular compliance rule, the user input further specifying the particular compliance rule of a plurality of pre-defined compliance rules; generating, by the computing system, the opportunity using a computer-implemented bidding tool, wherein the opportunity includes the opportunity data, and wherein generating the opportunity comprises associating the particular compliance rule with the opportunity; electronically communicating, by the computing system, the opportunity to a potential supplier; electronically receiving, at the computing system, a response from the potential supplier, the response including response attribute data for the particular response attribute; and using, by the computing system, a computer-implemented rules engine, evaluating the response attribute data for the particular response attribute using the particular compliance rule.

2. The method of claim 1, further comprising performing an action based on the evaluating.

3. The method of claim 2, wherein the action comprises flagging the response.

4. The method of claim 2, wherein the action comprises assigning a weight to the response.

5. The method of claim 2, wherein the action comprises discarding the response.

6. The method of claim 1, wherein the plurality of pre-defined compliance rules includes a discard rule for discarding a response based on response attribute data.

7. The method of claim 1, wherein the plurality of pre-defined compliance rules includes a weighting rule for assigning a weight to a response based on response attribute data.

8. The method of claim 1, wherein the plurality of pre-defined compliance rules includes a processing rule for processing the response based on response attribute data.

9. The method of claim 1, further comprising automatically determining a winner for the opportunity.

10. The method of claim 1, wherein the particular response attribute is a supplier identification.

11. The method of claim 10, wherein the particular compliance rule is a supplier ranking rule, and wherein evaluating the response attribute data for the particular response attribute using the particular compliance rule comprises assigning a weight to the response based on the supplier identification.

12. A computer-implemented method, comprising:
receiving, at a computing system, user input via a computer-user interface, the input specifying a particular response attribute of a plurality of response attributes to evaluate using a compliance rule; receiving, at the computing system, user input specifying a particular compliance rule of a plurality of pre-defined compliance rules to evaluate attribute data for the particular response attribute; and receiving, at the computing system, user input specifying an action to take based on evaluating the attribute data using the particular compliance rule.

13. The method of claim 12, further including receiving user input to associate the particular compliance rule with a later-created opportunity representing a particular commercial transaction.

14. The method of claim 13, wherein the user input includes a criterion to automatically determine whether to associate the particular compliance rule with the later-created opportunity.

15. The method of claim 12, further including:
receiving user input to create an opportunity representing a desired commercial transaction;
communicating the opportunity to a potential supplier;
receiving a response from the potential supplier, the response including response attribute data for the particular response attribute; and
evaluating the response attribute data for the particular response attribute using the particular compliance rule.

16. An article comprising a non-transitory machine-readable medium storing instructions operable to cause one or more machines to perform operations comprising: receiving user input to generate an opportunity representing a desired commercial transaction, the user input including opportunity data associated with the desired commercial transaction; receiving user input to associate a particular compliance rule with the opportunity, the user input specifying a particular response attribute of a plurality of response attributes to be evaluated according to the particular compliance rule, the user input further specifying the particular compliance rule of a plurality of pre-defined compliance rules; communicating the opportunity to a potential supplier; receiving a response from the potential supplier, the response including response attribute data for the particular response attribute; and evaluating the response attribute data for the particular response attribute using the particular compliance rule.

17. The article of claim 16, wherein the operations further comprise performing an action based on the evaluating.

18. The article of claim 17, wherein the action comprises flagging the response.

19. The article of claim 17, wherein the action comprises assigning a weight to the response.

20. The article of claim 17, wherein the action comprises discarding the response.

21. The article of claim 16, wherein the plurality of pre-defined compliance rules includes a discard rule for discarding a response based on response attribute data.

22. The article of claim 16, wherein the plurality of pre-defined compliance rules includes a weighting rule for assigning a weight to a response based on response attribute data.

23. The article of claim 16, wherein the plurality of pre-defined compliance rules includes a processing rule for processing the response based on response attribute data.

24. The article of claim 16, wherein the operations further comprise automatically determining a winner for the opportunity.

25. The article of claim 16, wherein the particular response attribute is a supplier identification.

26. The article of claim 25, wherein the particular compliance rule is a supplier ranking rule, and wherein evaluating the response attribute data for the particular response attribute using the particular compliance rule comprises assigning a weight to the response based on the supplier identification.

27. A system, comprising:
means for receiving user input to generate an opportunity representing a desired commercial transaction, the user input including opportunity data associated with the desired commercial transaction;
means for receiving user input to associate a particular compliance rule with the opportunity, the user input specifying a particular response attribute of a plurality of response attributes to be evaluated according to the particular compliance rule, the user input further specifying the particular compliance rule of a plurality of pre-defined compliance rules;
means for generating the opportunity including the opportunity data;
means for associating the particular compliance rule with the opportunity;
means for communicating the opportunity to a potential supplier;

means for receiving a response from the potential supplier, the response including response attribute data for the particular response attribute; and means for evaluating the response attribute data for the particular response attribute using the particular compliance rule.

28. The system of claim 27, further comprising means for performing an action based on the evaluating.

29. The system of claim 28, wherein the action comprises flagging the response.

30. The system of claim 28, wherein the action comprises assigning a weight to the response.

31. The system of claim 28, wherein the action comprises discarding the response.

32. The system of claim 27, wherein the plurality of predefined compliance rules includes a discard rule for discarding a response based on response attribute data.

33. The system of claim 27, wherein the plurality of predefined compliance rules includes a weighting rule for assigning a weight to a response based on response attribute data.

34. The system of claim 27, wherein the plurality of predefined compliance rules includes a processing rule for processing the response based on response attribute data.

35. The system of claim 27, further comprising means for automatically determining a winner for the opportunity.

36. The system of claim 27, wherein the particular response attribute is a supplier identification.

37. The system of claim 36, wherein the particular compliance rule is a supplier ranking rule, and wherein evaluating the response attribute data for the particular response attribute using the particular compliance rule comprises assigning a weight to the response based on the supplier identification.

* * * * *